United States Patent Office 2,954,412
Patented Sept. 27, 1960

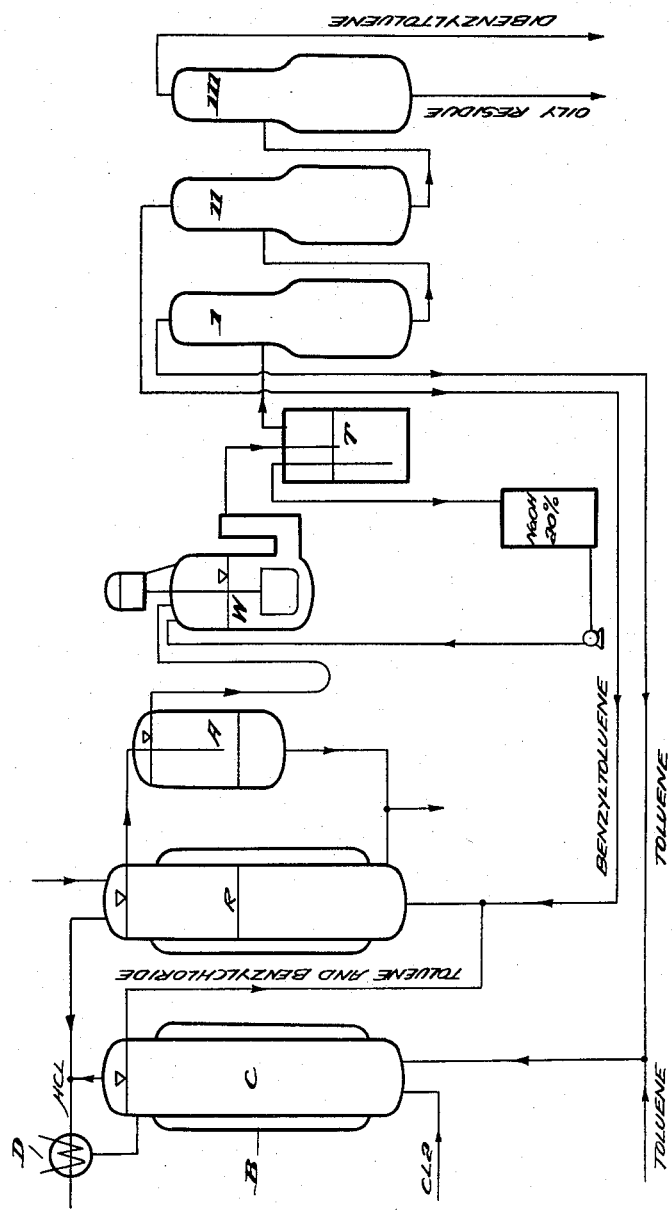

2,954,412
PROCESS FOR THE PREPARATION OF DIBENZYLBENZENES

Horst-Dieter Wulf and Nikolaus Roh, Marl, Kreis Recklinghausen, Germany, assignors to Chemische Werke Huls Aktiengesellschaft, Marl, Kreis Recklinghausen, Germany Filed June 17, 1957, Ser. No. 666,132

Claims priority, application Germany Jan. 10, 1957

3 Claims. (Cl. 260—668)

It is known that by the reaction of benzyl chlorides with benzene hydrocarbons according to Friedel-Crafts there are formed, in addition to the diphenylmethanes, also smaller quantities of dibenzylbenzenes as well as resinous products. In this process one is not in a position to increase the quantity of dibenzyl-benzenes formed by increasing the ratio of the benzyl chlorides to the benzene hydrocarbons because under the reaction conditions the benzylchlorides form worthless resins by self-condensation. Dibenzylbenzenes have also been prepared by reacting diphenylmethane with benzylchlorides according to Friedel-Crafts but the corresponding dibenzylbenzenes are obtained in poor yields.

It has been found that one can obtain dibenzylbenzenes with the general formula

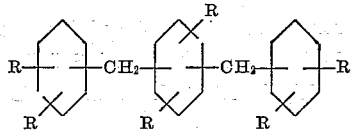

(R equals H, alkyl, aralkyl, halogen, nitro, hydroxy, alkoxy) in excellent yields, when one reacts a diphenylmethane with a benzylchloride in the presence of a benzene hydrocarbon, which is suitable for the formation of diphenylmethanes, according to Friedel-Crafts.

In this way it is possible to obtain the dibenzylbenzenes, which may also contain still higher benzylated benzenes, in yields of 75–85% of the theory.

Suitable diphenylmethanes are diphenylmethane itself, its homologs, such as ditolylmethane, dixylylmethane, dimesitylmethane, phenyltolylmethane, phenylxylylmethane, phenylmesitylmethane as well as their halogen, nitro, hydroxy and alkoxy derivatives.

Suitable benzylchlorides are benzylchloride itself, its homologs, such as the xylyl chlorides, polymethylbenzylchloride and the corresponding nuclear-substituted benzylchlorides, for example chlorobenzyl chloride, nitrobenzyl chloride, hydroxybenzyl chloride, methoxybenzyl chloride, chloroxylyl chloride, etc.

As benzene hydrocarbons one may use for example, benzene, toluene, xylene, and mesitylene as well as their nuclear-substituted derivatives such as chlorotoluene, nitrotoluene, xylenol, anisole, etc.

As catalysts for the Friedel-Crafts reaction one may use for example aluminum chloride, iron chloride, boron fluoride, concentrated sulfuric acid and anhydrous hydrofluoric acid.

The process is carried out in such a way that the diphenylmethane consumed in the reaction can form simultaneously from the available benzyl chloride and benzene hydrocarbon. For example for 1 mole of diphenylmethane, 1 to 4 moles of a benzene hydrocarbon as well as up to 2 moles of a benzyl chloride are supplied. In order to avoid undesirable reaction of the benzylchloride with itself it is expedient to keep the amount of the benzylchloride below 2 moles for example at 0.4 to 1.6 moles.

An advantageous mode of execution of the process consists in first preparing the required benzylchloride from a methyl-substituted benzene hydrocarbon, for example toluene, xylene or their derivatives by chlorinating at temperatures between 60 and 150° C. and by illuminating with ultraviolet rays in such a way that 70–90% by weight of the unchanged benzene hydrocarbon remain. This may take place discontinuously or continuously, expediently under a slight excess pressure of 0.5 to 1 atmosphere. The mixture of unchanged benzene hydrocarbon and benzyl chloride obtained is then reacted with the diphenylmethane according to Friedel-Crafts. This also can be done discontinuously or continuously, the latter for example by leading the reactants into a reaction container which is equipped with overflow, and contains the Friedel-Crafts catalyst. The temperatures to be maintained depend on the catalyst used and the other circumstances. In using aluminum chloride for example a suitable temperature is within the range from 30 to 80° C.

After the reaction is completed the catalyst is separated. The reaction mixture is then neutralized with sodium hydroxide, washed with water and subjected to fractional distillation. The unreacted benzene hydrocarbon comes over first, then the newly formed diphenylmethane derivative, both of which can be used anew for the reaction with a benzylchloride. Subsequently the dibenzylbenzene is distilled off; a viscous oil remains behind.

Apparatus suitable for carrying out the process as described in Example 3 is diagrammatically illustrated in the accompanying drawing.

Example 1

Into 5300 gm. (50 moles) of xylene, which is heated in a lead-lined container to 120° C., are gradually introduced 1700 gm. of chlorine. About 3370 gm. (24 moles) of xylyl chloride is formed. To the resulting mixture, which contains 2780 gm. (26.2 moles) of unchanged xylol, are added 2520 gm. (12 moles) of xylylxylene (mixture of the isomers). Then the mixture is gradually transferred, with stirring, into an enamelled stirring vessel, containing 50 gm. of aluminum chloride, while maintaining the temperature at about 50° C. As soon as the hydrogen chloride evolution is concluded the fluid reaction mixture is separated from the oily aluminum chloride double compound, the separated reaction mixture is washed with water and then with sodium hydroxide solution, and then distilled. There are obtained 2310 gm. of dixylylxylene, corresponding to a yield of 84.9% of the theory, calculated on the basis of the xylene consumed, in addition to 2560 gm. of xylene, 2520 gm. of xylylxylene (mixture of the isomers) and 350 gm. of an oily residue.

Example 2

1265 gm. (10 moles) of chlorotoluene (mixture of the isomers), 1400 gm. (5.6 moles) of chlorobenzylchlorotoluene (mixture of the isomers) and 810 gm. (5 moles) of chlorobenzylchloride (mixture of the isomers) are gradually put into a stirring vessel, heated to 80° C., containing 75 gm. of iron chloride. In the course of 2 hours the temperature is gradually raised to 120° C. The vessel is then cooled and the contents washed first with concentrated hydrochloric acid and subsequently with 20% sodium hydroxide solution. By fractional distillation of the residue there are obtained 720 gm. of (dichlorobenzyl)-chlorotoluene (mixture of the isomers) as a viscous mass, permeated with crystals, in a yield of 76.8% of the theory, referred to the chlorotoluene consumed, 960 gm. of chlorotoluene, 1380 gm. of chlorobenzylchlorotoluene (mixture of the isomers) and 185 gm. of an oil residue.

*Example 3*

Into a lead-lined tower C having a capacity of 10 liters, which is provided with a jacket B suitable for heating and cooling there are introduced 4340 gm. of toluene and 710 gm. of chlorine per hour at 110° C. A mixture of 3410 gm. of toluene and 1260 gm. of benzyl chloride is withdrawn from the top of the tower per hour. 365 gm. of hydrogen chloride per hour escape from the top of the tower through a reflux condenser D. The removed toluene-benzyl chloride mixture is delivered together with 3300 gm. of benzyltoluene per hour into an enamelled tower R having a capacity of 10 liters, which is filled one third fully of the oil aluminum complex compound formed by the addition of anhydrous aluminum chloride to the reaction mixture, and is kept at 60–70° C. Every hour there escape from the tower R about 300 gm. of hydrogen chloride which also flows to the reflux condenser D. The reaction mixture leaves the tower R through an overflow located in the upper third thereof and flows to the settling container A, in which the aluminum chloride complex compound carried along is separated and is led back into the lower part of the tower R. To maintain the activity of the aluminum chloride complex compound 22 gm. of aluminum chloride per hour are introduced into the tower R at the top. At the same time a corresponding quantity of the consumed aluminum chloride complex compound is withdrawn at the lower exit of the settling container A in order to maintain the level of the aluminum chloride complex compound in the tower R. From the settling container A the reaction mixture flows to the stirring container W, in which it is washed with 20 sodium hydroxide solution. In the separating container T the sodium hydroxide is separated and led back into the stirring container W, the consumed sodium hydroxide, being replaced. Then the reaction mixture is distilled in columns I, II and III. 3010 gm. of toluene are recovered per hour in column I, which is returned to the tower C, with addition of 1330 gm. of fresh toluene. The sump contents of the column I is delivered into the vacuum column II, from which 3300 gm. of benzyltoluene distill off per hour, which together with the toluenebenzyl chloride mixture removed from tower C is delivered to tower R. The sump contents of the vacuum column II is introduced into vacuum column III, from which 1100 gm. of dibenzyl toluene per hour distill off, while 90 gm. of an oily residue are withdrawn hourly from the sump of column III. The yield of dibenzyltoluene amounts to 84% of the theory, referred to reacted toluene.

We claim:

1. Process for the preparation of dibenzylbenzenes from diphenylmethanes and benzyl chloride which comprises reacting a diphenylmethane with a benzylchloride in the presence of a benzene hydrocarbon and a Friedel-Crafts catalyst, and separating the reaction mixture formed by distillation.

2. Process as defined in claim 1 in which the benzylchloride and the benzene hydrocarbon are supplied to the reaction in the form of a mixture produced by partial chlorination of a methyl substituted benzene hydrocarbon in the side chain.

3. Process as defined in claim 1 in which the ratio of the reactants in the reaction mixture is maintained at from 1 to 4 moles of the benzene hydrocarbon and from 0.4 to 1.6 moles of benzylchloride per mole of diphenylmethane.

References Cited in the file of this patent

UNITED STATES PATENTS 2,620,353      Lippincott et al.      Dec. 2, 1952